United States Patent [19]

Kano et al.

[11] Patent Number: 4,535,416
[45] Date of Patent: Aug. 13, 1985

[54] ELECTRONIC COMPACT FUNCTION CALCULATOR

[75] Inventors: Kuniomi Kano, Yokohama; Hideo Fushimoto; Kazumi Sekine, both of Kawasaki; Akira Miyagawa; Osamu Hirata, both of Tokyo; Yoshiaki Nishimuro, Hachiohji, all of Japan

[73] Assignee: Canon Kabushiki Kaisha, Tokyo, Japan

[21] Appl. No.: 681,065

[22] Filed: Dec. 12, 1984

Related U.S. Application Data

[63] Continuation of Ser. No. 350,061, Feb. 18, 1982, abandoned.

[30] Foreign Application Priority Data

Mar. 9, 1981 [JP] Japan .................................. 56-32443

[51] Int. Cl.³ ............................................ G06F 15/02
[52] U.S. Cl. ..................................... 364/715; 364/731
[58] Field of Search ............... 364/715, 731, 710, 861, 364/721, 200, 900, 422; 340/728, 747

[56] References Cited

U.S. PATENT DOCUMENTS

| | | | |
|---|---|---|---|
| 3,349,230 | 10/1967 | Hartwell et al. | 364/721 |
| 3,529,138 | 9/1970 | Andre et al. | 364/721 |
| 3,636,333 | 1/1972 | Klund | 364/721 |
| 3,983,495 | 9/1976 | Epstein | 364/721 |
| 4,024,385 | 5/1977 | Richards | 364/721 |
| 4,101,962 | 7/1978 | Hakata | 364/715 |
| 4,127,897 | 11/1978 | Spangler et al. | 364/900 |
| 4,172,286 | 10/1979 | Wess | 364/721 |
| 4,184,202 | 1/1980 | McCrae | 364/715 |
| 4,217,702 | 8/1980 | Bennch | 364/861 |
| 4,241,412 | 12/1980 | Swain | 364/731 |
| 4,322,816 | 3/1982 | Spangler et al. | 364/900 |
| 4,342,094 | 7/1982 | Boone | 364/900 |
| 4,355,357 | 10/1982 | Chan | 364/422 |

*Primary Examiner*—Jerry Smith
*Assistant Examiner*—Michael R. Fleming
*Attorney, Agent, or Firm*—Fitzpatrick, Cella, Harper & Scinto

[57] ABSTRACT

An electronic compact function calculator of the invention has a keyboard including function keys, numeral-/operation keys, and a graphic print key for accessing a graphic pattern of a desired function; a ROM storing graphic patterns of functions; and a display device or printer for displaying or printing the graphic pattern. The graphic representation of a function can be performed by a simple operation.

2 Claims, 5 Drawing Figures

| ABSOLUTE ADDRESS | CONTENTS |
|---|---|
| 0200 – 0399 | SIN GRAPHIC PATTERN |
| 0400 – 0599 | COS GRAPHIC PATTERN |
| 2400 – 2599 | LOG GRAPHIC PATTERN |
| 2600 – 2799 | √ GRAPHIC PATTERN |

RELATIVE ADDRESS +200

140 BITS

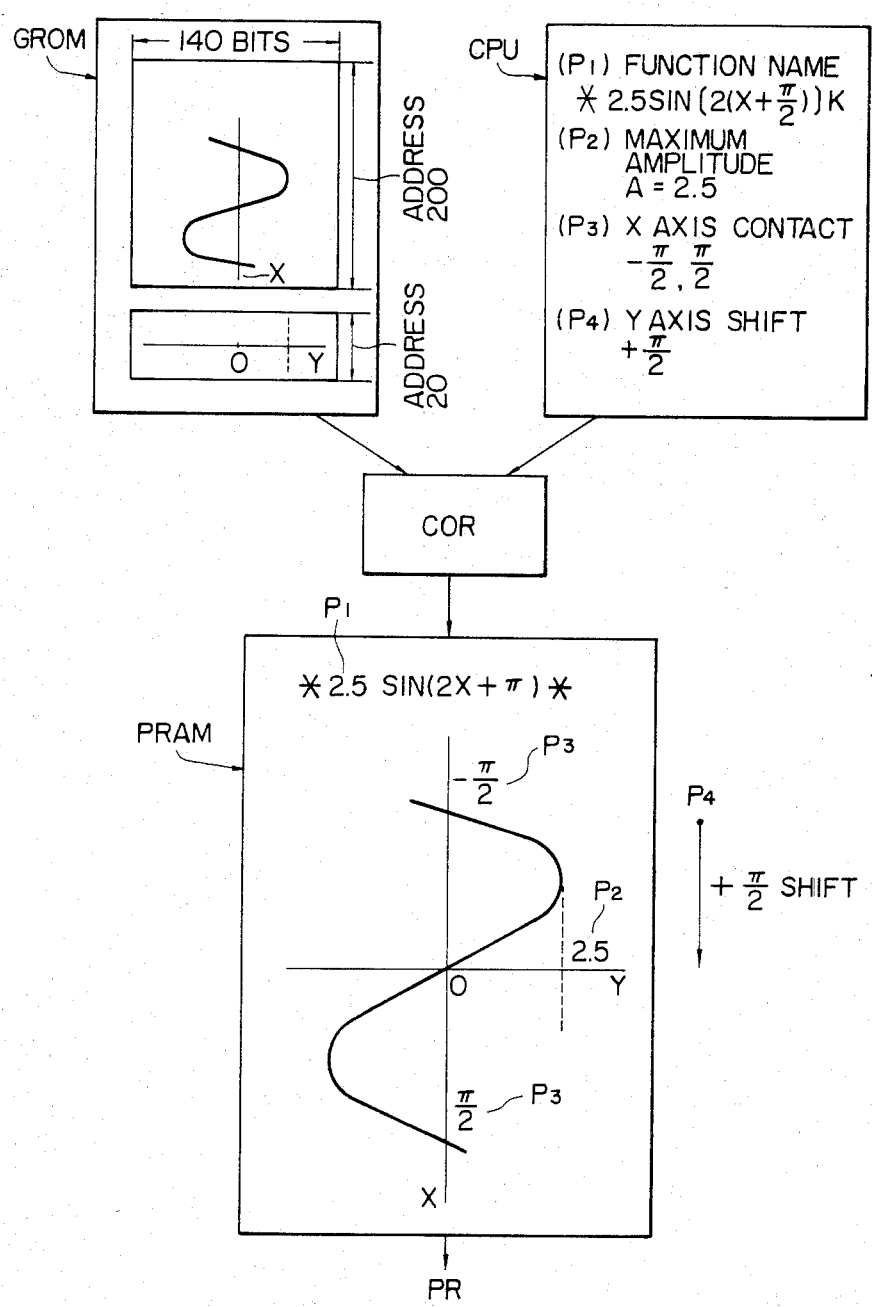

ELECTRONIC COMPACT FUNCTION CALCULATOR

This application is a continuation of application Ser. No. 350,061 filed Feb. 18, 1982, now abandoned.

BACKGROUND OF THE INVENTION

1. Field of the Invention

The present invention relates to a compact function calculator which is capable of function calculations.

2. Description of the Prior Art

In a conventional function calculator, a function calculation is performed using function keys and numeral keys, and the obtained result is displayed by a display device or output by a printer. With a conventional function calculator of this type, the calculation result can be obtained as numerical data by the display device or printer. However, a change of the function cannot be visually confirmed.

SUMMARY OF THE INVENTION

The present invention has been made in consideration of this, and it is an object of the present invention to provide an electronic compact function calculator comprising means for performing a function calculation, which is normally included in a function calculator, and a function recognizing means for providing a graphic expression or the like of a function, so that function patterns in various kinds of function operations by the function calculator may be visually displayed to allow clear recognition of the properties of the functions. Therefore, the learning effect of the function calculations made by using the function calculator may be increased, and proving of the calculation results may be performed efficiently.

The graphic expression is known as an effective method for allowing clear recognition of the properties of the respective functions. Examples of means for providing graphic expression include printers, display devices such as liquid crystal display devices or the like. The preferred embodiment of the present invention will be described with reference to a calculator which allows the user to easily recognize a function by graphic expression with a printer.

BRIEF DESCRIPTION OF THE DRAWINGS

FIG. 5 is a view showing the manner according to which GROM data and CPU operation data of the calculator shown in FIG. 4 are synthesized and written in a PRAM.

DETAILED DESCRIPTION OF THE PREFERRED EMBODIMENTS

Figure 1:
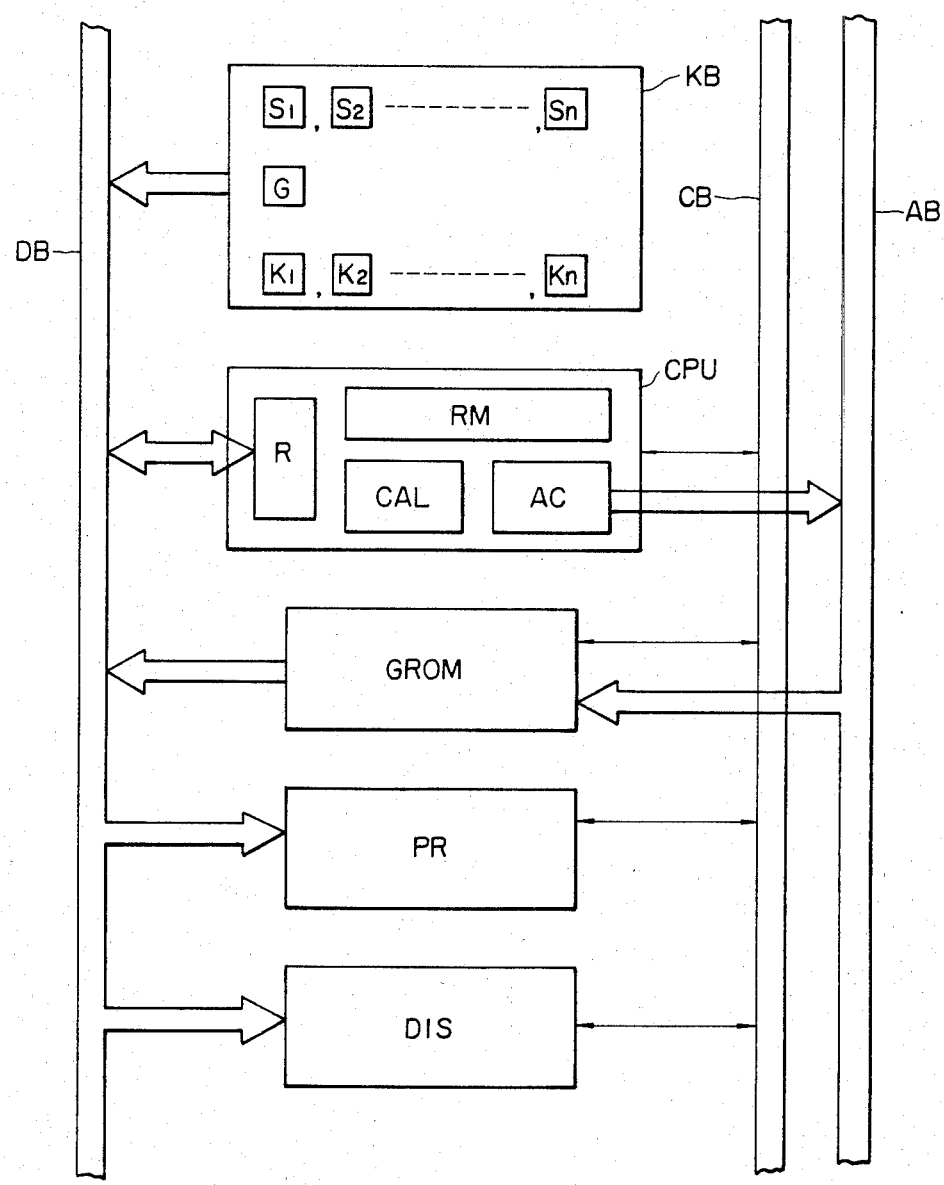
FIG. 1 is a schematic block diagram showing an electronic compact function calculator according to the first embodiment of the present invention.

FIG. 1 is a block diagram of the first embodiment in which the present invention is applied to graphic expression by a printer.

Figures 2, 3:
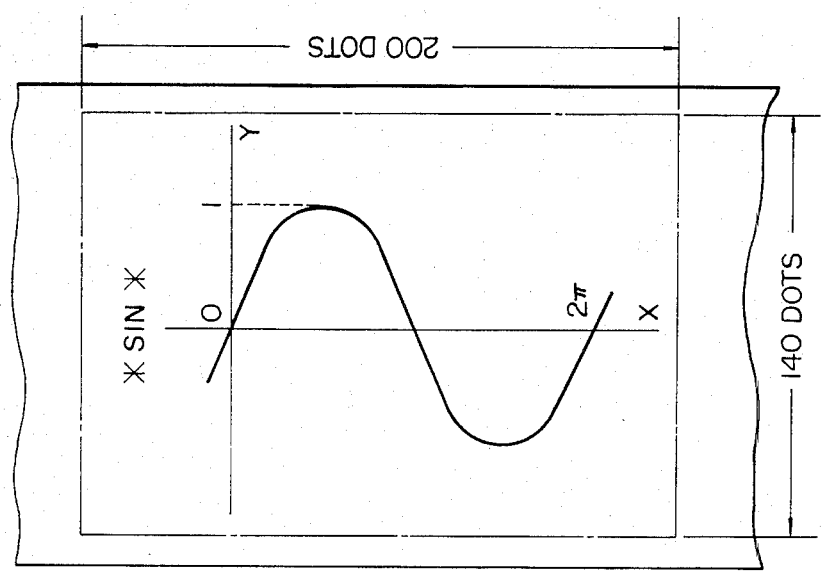
FIG. 2 is a view showing the graphic patterns of functions stored at predetermined addresses of a GROM.
FIG. 3 is a view showing a function pattern printed by the calculator shown in FIG. 1.

The calculator shown in FIG. 1 includes a data bus DB; a control bus CB for a read/write signal for a memory, a read/write signal for an I/0, a request signal for DMA transfer, and an acknowledge signal; and an address bus AB. A keyboard KB has function keys S1, S2, ..., Sn (e.g., SIN, LOG, $\sqrt{\ }$, 1/X, Gaussian function, and so on); numeral/operation keys K1, K2, ..., Km (e.g., 0 to 9, clear, four arithmetic operations, memory, and so on); and a graphic print key G which is particularly added according to the present invention. A central processing unit CPU consists of an I/0 buffer R, a program memory RM, a control arithmetic logic CAL, an address counter AC, and so on. A graphic read-only memory GROM shown in FIG. 2 stores the graphic pattern of each function as shown in FIG. 2. A printer PR may comprise a dot printer which prints in dots, a thermal printer, an ink jet printer or the like. A display device DIS displays the calculation result. These units are connected through the data bus DB, the control bus CB, and the address bus AB, and function in the manner to be described below.

The calculator of the first embodiment of the present invention has the configuration as described above and functions in the manner to be described below.

In a general function calculation, when the function keys S1 to Sn and the numeral/operation keys K1 to Km are depressed according to the operation procedure, the input data is sequentially stored in the I/0 buffer R in the CPU; subjected to the desired calculation by the memory RM and the control arithmetic logic CAL; and the calculation process and result are output to the printer or the display device.

In order to print a graph of a function, when the function keys S1 to Sn are depressed and the graphic print key G is then depressed, the corresponding graph is printed. For example, when the SIN key is depressed and the graphic print key G is depressed thereafter, the SIN curve as shown in FIG. 3 is printed. In this case, one graphic pattern is printed in a matrix pattern of 140×200 dots (corresponding to cartesian X-Y coordinates). In this matrix pattern, the name of the function and the SIN curve for one period with a scale representing the maximum amplitude are printed.

The mode of operation for this will be described below. When the SIN, for example, key Si is depressed, the input signal is stored in the I/0 buffer R through the data bus DB. When the control arithmetic logic CAL detects the depression of the SIN key Si, a SIN routine stored in the memory RM is accessed. When the graphic print key G is depressed at this time, the control arithmetic logic CAL detects this. Then, a graphic print routine in the SIN routine is accessed. The initial address of the graphic read-only memory GROM storing the graphic pattern of the SIN curve is designated by the address counter AC through the address bus AB. Then, by relative address designation, the data from the initial address to address 200 is DMA transferred to the printer PR through the data bus DB, and the graphic pattern as shown in FIG. 3 is printed. The graphic patterns of the respective functions are stored in every 200 addresses of the GROM shown in FIG. 2. Each address of the GROM stores data to specify a position in 140 positions so as to output a graphic pattern in a matrix form of 140×200 dots.

In the first embodiment described above, only a fixed graphic pattern may be printed for each function. However, a graphic pattern of an arbitrarily selected function may be printed by adding an unknown key K, a ( )

key, a CPU read-only memory CROM and a CPU random-access memory CRAM incorporated in the CPU in place of the program memory RM, a printer random-access memory PRAM for synthesizing and storing the graphic pattern, and a data control COR for controlling the data to be written in the PRAM.

Figure 4:
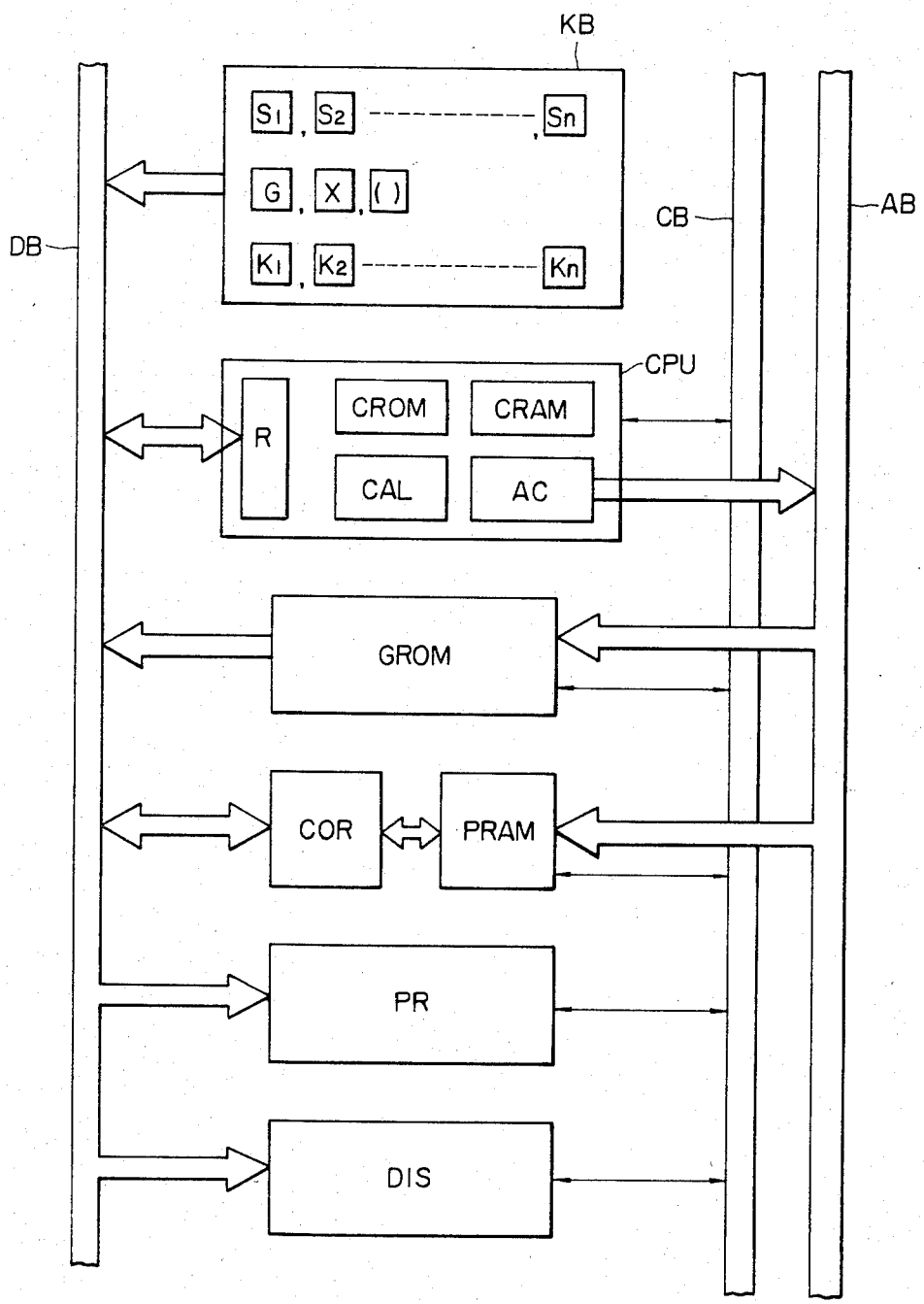
FIG. 4 is a schematic block diagram of an electronic compact function calculator according to the second embodiment of the present invention.

FIG. 4 is a schematic block diagram of an electronic compact function calculator according to the present invention for performing the operation as described above. The same reference symbols as in FIG. 1 denote the same parts excluding the X key, ( ) key, CROM, CRAM, COR, PRAM; the description thereof will be omitted. For the purpose of comparison of the second embodiment with the first embodiment described above, the second embodiment will now be described with reference to the case of a SIN function.

Assume that keys are sequentially depressed in the order of "2", ".", "5", "X", "SIN", "( )", "2", "X", "+", "$\pi$", "( )" to store the expression $2.5\sin[2(X+\pi/2)]$ in the I/0 buffer R of the CPU. When the graphic print key G is depressed next, the control arithmetic logic CAL detects the sequential depression of the keys "SIN" and "( )" to call the "A·sin[B×(X+C)]" (where A>0) routine from the program stored in the CPU read-only memory CROM. The graphic pattern is called by preparing, by calculation, data for expressing a graphic pattern of a SIN curve designated by this routine, and by designating the addresses storing the graphic pattern corresponding to "A·sin[B×(X+C)]" (where A>0). Then, this GROM data is transferred to the data control COR.

Unlike the case shown in FIG. 1, in the graphic read-only memory GROM, one graphic pattern is stored in 220 addresses as shown in FIG. 5. Of the 220 addresses, the initial 200 addresses store the graphic pattern of the SIN curve plotted along the X-axis without the Y-axis. The pattern of the Y-axis is stored in the remaining 20 addresses. This is for the purpose of expressing the change in the phase of the SIN curve by a shift of the Y-axis. In the case of A·sin[B×(X+C)], the data prepared by the CPU (CPU operation data) includes the following four data:

(P1) Function name: Contents of the I/0 buffer in the CPU (P2) Maximum amplitude: A (P3) X-axis contact of graph: $-C'$, $2\pi/B - C'$ [where $C' = \text{MOD}(C, 2\pi/B)$]

(P4) Y-axis shift: When the unit on the X-axis is expressed in P dots, the phase change of C' is expressed by shifting the Y-axis by $C' \times P$ addresses from the reference address.

These four kinds of data are prepared according to the routine for "A·sin[B×(X+C)]" (where A>0). The data control COR synthesizes the GROM data and the CPU operation data, and writes it in the PRAM. As shown in FIG. 5, the graphic pattern of the SIN curve of the GROM is first written in the PRAM, so that the scale dot configuration of the X-Y coordinates is determined by the designated function and the maximum period. The graphic pattern corresponding to the Y-axis of the GROM is shifted for the determined number of dots along the Y-axis, and is written in the PRAM.

On the basis of the CPU operation data, the designated function relation stored in the I/0 buffer of the CPU is written at the top of the PRAM as bracketed by *. The maximum amplitude A on the Y-axis and the X-axis contacts are written in predetermined positions to complete the designated graphic pattern. In response to a control signal from the CPU, the contents of the PRAM are transferred to the printer PR. Among the contents of the PRAM, P1 corresponds to the function name; P2, the maximum amplitude; P3, the X-axis contact; and P4, the reference position on Y-axis.

By the operation as described above, the graphic printing of the SIN function is performed while the graphic pattern of the SIN curve is fixed. The above description has been made with reference to a SIN function. However, graphic printing may be performed for other kinds of functions in a similar manner.

According to the present invention, a calculator for performing function calculations by depression of function keys and numeral/operation keys has a function recognition means in addition to the means for performing the general function calculation. Therefore, in addition to the function calculations, the properties of the respective functions may be clearly expressed by graphic expression or the like, so that the learning effect of the function calculations may be increased, confirmation of the function operation result may be visually performed, and calculation efficiency may be improved.

What we claim is:

1. An electronic apparatus for graphically displaying a function, said apparatus comprising:
    memory means for independently storing a graphic function pattern and a graphic coordinate pattern for the function pattern;
    input means for entering numerical values associated with a characteristic of the function pattern stored in said memory means, the characteristic representing the relative position of the function pattern and the coordinate pattern stored in said memory means;
    processor means connected to said input means and responsive to the numerical values entered thereby for determining the relative positions of the function pattern and the coordinate pattern represented by the characteristic;
    display means for displaying the function pattern and the coordinate pattern; and
    control means connected to said processor means and responsive to the relative positions determined thereby for relatively positioning the function pattern and the coordinate pattern in accordance with the characteristic for display by said display means.

2. An electronic apparatus according to claim 1, wherein
    said processor means further determines numerical values representing the relative positions of the function pattern and the coordinate pattern; and wherein
    said control means includes means for controlling said display means to display the numerical values determined by said processor means.

* * * * *